United States Patent [19]

Abraham et al.

[11] 4,380,274
[45] Apr. 19, 1983

[54] HOLDING A PLANETARY GEAR CARRIER RELATIVE TO AN AXLE

[76] Inventors: Uwe Abraham, Mittelstr. 18, 4350 Recklinghausen; Karl-Heinz Jakubowski, Tilsiter Str. 22, 4620 Castrop-Rauxel; Wilhelm Köster, Hagemer Kirchweg 11, 4354 Datteln, all of Fed. Rep. of Germany

[21] Appl. No.: 256,677

[22] Filed: Apr. 22, 1981

[30] Foreign Application Priority Data

Apr. 22, 1980 [DE] Fed. Rep. of Germany ....... 3015818

[51] Int. Cl.³ .............................................. B60K 7/00
[52] U.S. Cl. ..................................... 180/308; 74/789; 74/792; 180/70 R
[58] Field of Search ..................... 180/308, 70 R, 247, 180/10, 65 F; 74/789, 792, 770

[56] References Cited

U.S. PATENT DOCUMENTS

| | | | |
|---|---|---|---|
| 3,954,026 | 5/1976 | Rittmann et al. | 180/308 |
| 4,162,713 | 7/1979 | Heitman et al. | 180/308 |
| 4,271,725 | 6/1981 | Takao et al. | 74/789 |
| 4,334,590 | 6/1982 | Plumb | 180/70 R |

Primary Examiner—Joseph F. Peters, Jr.
Assistant Examiner—Donn McGiehan

[57] ABSTRACT

An internal spline of a hollow shaft containing a hydrostatic motor receives an external spline of a sleeve extending from a planetary carrier being part of a two-stage planetary gear transmission for imparting rotation on a hub being journalled on the shaft. An annular disk with radially inwardly directed teeth has been slipped onto the external spline, with play between it and the carrier; after turning the disk to align its teeth with the external spline ridges, it is releasably secured to the shaft end after the latter's internal spline has received the external spline. The disk permits relative axial movement of the carrier bounded by it and by the external spline.

4 Claims, 4 Drawing Figures

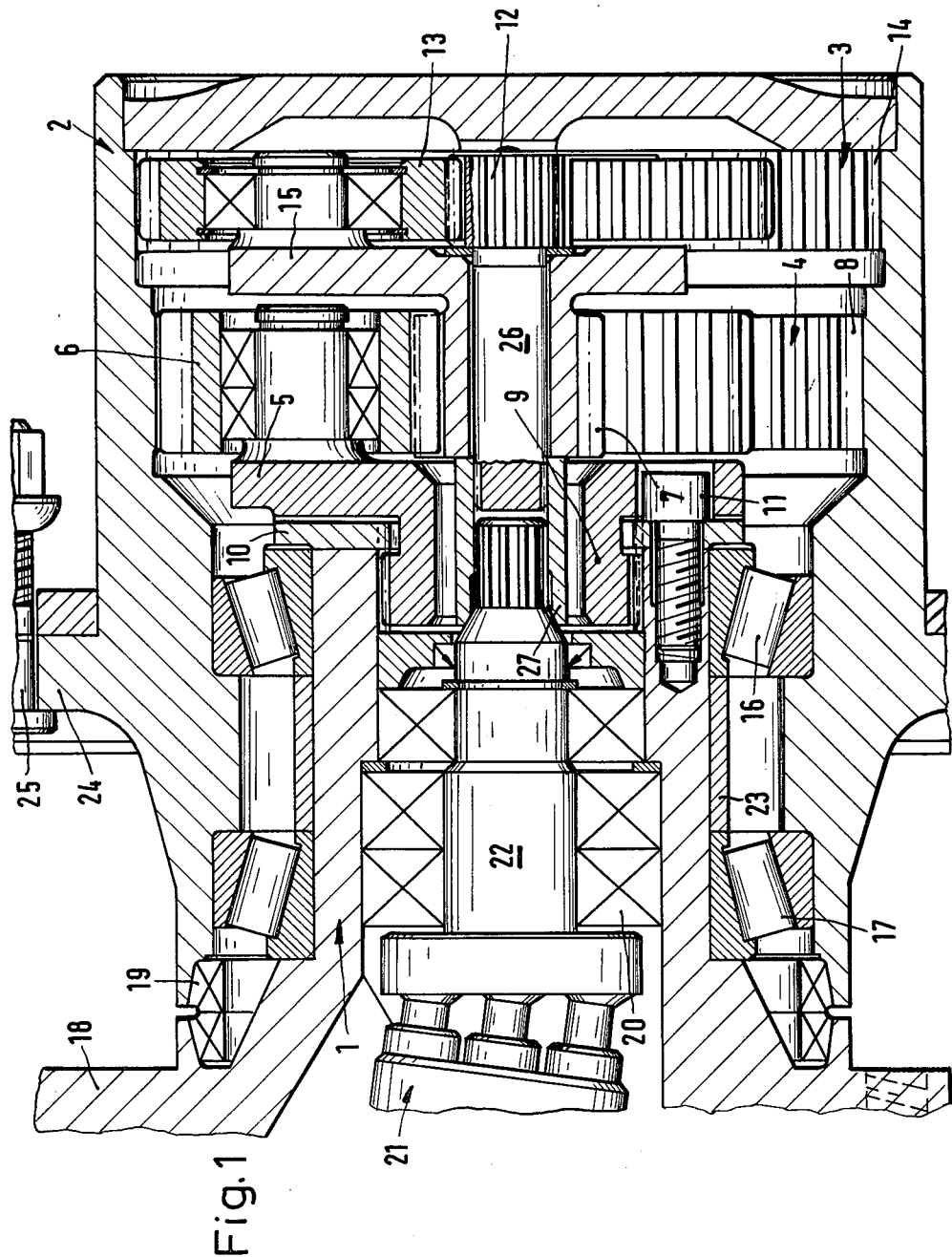

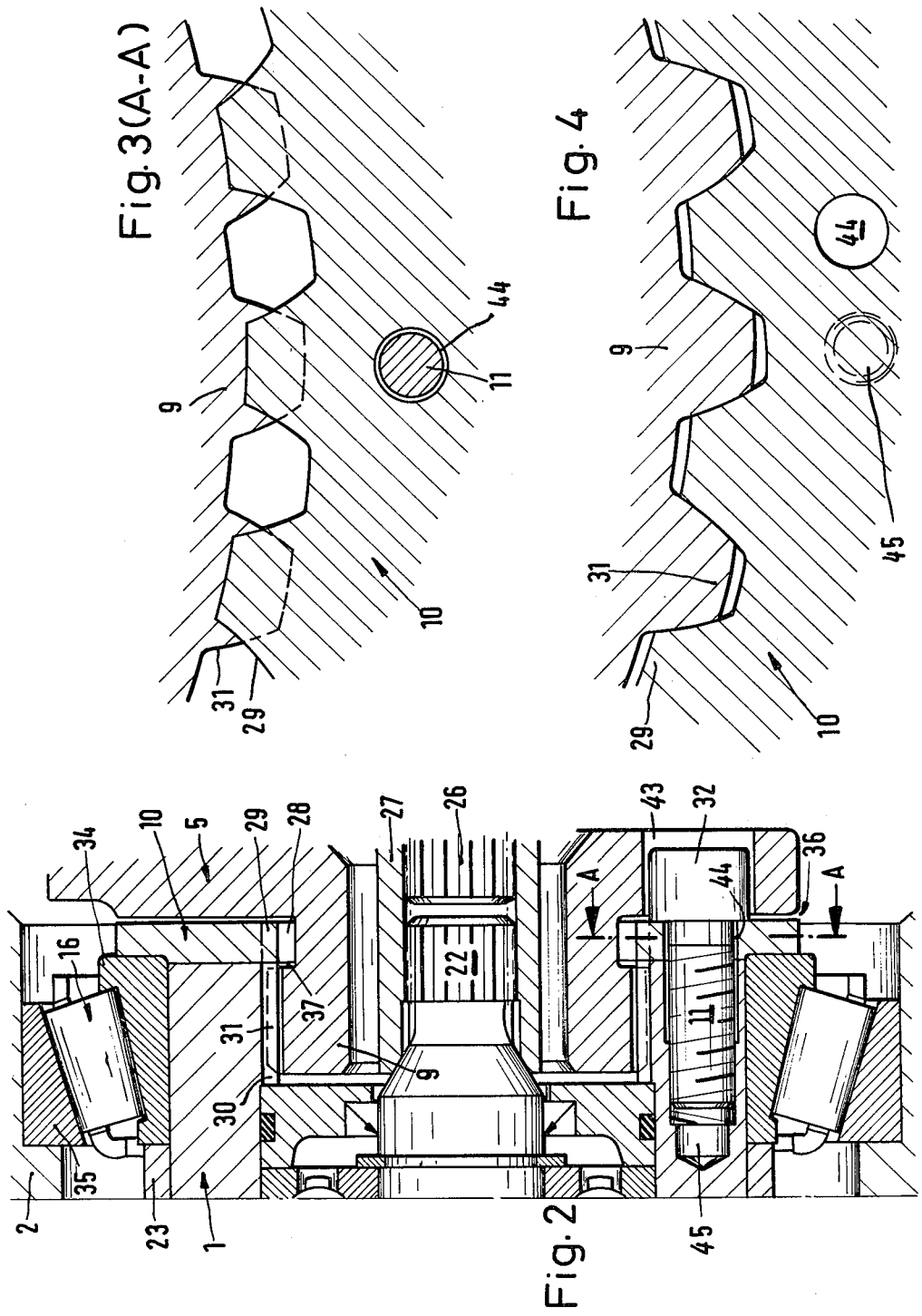

HOLDING A PLANETARY GEAR CARRIER RELATIVE TO AN AXLE

BACKGROUND OF THE INVENTION

The present invention relates to a positive connection between an axially movable planetary gear carrier and a pin, shaft, or the like.

Hydrostatic drives, for example for vehicles, include frequently a planetary gear set for torque transmission. The drive includes a shaft or pin to be connected to the planetary gear input. The planetary gear carrier must be supported against torque transmission and is, therefore, to be connected to a supporting journal that extends, e.g., from the vehicle frame. The connection is effected, for example, by means of splines on the journal and on the carrier, the latter having a spline sleeve engaging a matching spline on that journal in order to provide a positive connection with respect to its rotation that permits some limited axial displacement between the interconnected parts.

DESCRIPTION OF THE INVENTION

It is an object of the present invention to provide a new and improved connection and link for a planetary gear set to have its planetary carrier held against rotation under axially displaceable conditions;

It is another object of the present invention to improve the assembly and construction of a hydrostatic hub drive with planetary gear type transmission;

It is a further object of the present invention to provide a new and improved spline connection.

In accordance with the preferred embodiment of the present invention, a spline connection is suggested in which an internal spline or a hollow shaft, e.g. a stationary one, engages an external spline on a shaft that extends from a flange-like element such as the carrier of planetary gears. An annular groove is provided between the external spline and the carrier, having a (radial) depth that is deeper than the grooves of the external spline. An annular disc with radially inwardly extending teeth is releasably secured to the axial end of the shaft having the internal spline; the disk is thinner than the annular groove is (axially) wide, and its teeth are aligned with the external spline ridges, thus serving as a stop for the external spline.

The flange-like planetary carrier pertains, preferably, to a set of planetary gears whose internal ring gears are part of the hub element that is journalled on the hollow shaft. This latter shaft contains, preferably, a hydrostatic drive whose rotary output is coupled, as an input, to the planetary gear set.

The invention limits the axial displacement range of the planetary carrier in both directions, but by means of a single element. This element, moreover, may provide additionally axial loading of bearings for the hub on the hollow shaft so that, in a very simple manner, multiple functions are provided for.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 1 is a cross section through a two-stage hydrostatic drive for vehicles;

FIG. 2 is an enlarged portion of FIG. 1;

FIG. 3 is a section taken along lines A—A in FIG. 2; and

FIG. 4 is a cross-section of parts shown in a position of mounting.

Proceeding now to the detailed description of the drawings, FIG. 1 shows a hub 2 which contains a first-stage planetary gear set 3 and a second planetary gear set 4. The first-stage set is comprised of a sun gear 12, planetary gears 13, a planetary gear carrier 15, and an internal ring gear 14, being actually worked into and part of hub 2.

The second-stage set 4 includes a sun gear 7, planetary gears 6, and a planetary carrier 5; also included is an internal ring gear 8 which is likewise integral with the interior wall structure of hub 2. A sleeve 9 extends in integral construction from planetary gear carrier 5. As fas as the specific feature of the invention is concerned, this carrier 5 acts as a flange with reference to sleeve or shaft 9.

External spline grooves and ridges of sleeve 9 mesh with matching spline ridges and grooves in the interior of a hollow shaft 1. This shaft 1 extends from, or is provided with, a flange 18 for connection to the frame of a vehicle; it is thus stationary. The wheel hub 2 is journalled on that journal 1 by means of load-bearing roller bearings 16 and 17.

Reference numeral 22 refers to a shaft or a hydrostatic motor 21; and that shaft 22 is journalled inside shaft 1 by means of several bearings 20. An internal sleeve spline 27 connects the motor shaft 22 to a shaft 26 which, in turn, carries the sun gear 12 of the first planetary gear set and stage 3. The connection is a positive one, torque is transmitted between these shafts with very little or no play.

Hub 2 is further provided with a flange 24, and reference numeral 25 refers to one of several bolts by means of which a wheel disk, or the like, is fastened to hub 2. Seals 19 seal the interior of hub 2. A sleeve-like spacer 23 is provided between the bearings 16 and 17, serving as a transmission element for the axial load, as will be described.

An annular disk 10 with radially inward-directed teeth is secured to the axial front end of axle 1 by means of a set of regularly arranged bolts. The disk is situated such that the planetary carrier 5 is on its other side.

FIG. 2 illustrates the gear-like disk 10 and its association with other parts in greater detail. Sleeve 9 is shown also here to have a peripheral spline 31, mentioned earlier. An annular recess 28 is provided axially juxtaposed to the spline's (31) grooves and ridges. That annular recess or groove 28 is bounded on the other side by the planetary gear carrier 5. The recess 28 is deeper than the grooves of spline 31. The gear-like disk 10 is situated to reach into that recess. However, the teeth of disk 10 do not reach the bottom of groove 28. This depth relation is provided in order to prevent any binding of disk 10 on part 9. Moreover, the teeth of disk 10 are, so to speak, 180° out of phase with the spline 30 (meshing spline 31). Thus, the spline 31 in shaft or sleeve 9 is not able to axially shift beyond the teeth of disk 10 (see FIG. 3).

The axial movability of flange and planetary carrier 5 is determined by a predetermined play which, in effect, is the sum of the axial plays 36 and 37, as illustrated in FIG. 2. Particularly, gap 36 defines the mobility of carrier 5 to the left toward disk 10, while the gap 36 defines the relative mobility of spline 31 to the right, also toward annular disk 10. This then limits the axial displaceability of the carrier 5 in both directions, but does permit displacement over a limited range.

The bearing 16 is axially loaded by means of the gear disk 10. Particularly disk 10 has a portion that extends radially beyond journal 1. That portion abuts the inner race 34 of bearing 16 to, thereby, produce the requisite axial tension force in the bearing. The outer race is denoted by 35, which is loaded with the rollers of bearing 16. Turning back to FIG. 1, one can readily see that the intermediate spacer 23 transmits loading tension from bearing 16 to bearing 17.

As far as assembly is concerned, one should consider the fact that originally the planetary gear sets are situated outside sleeve or hub 2. Gear disk 10 is shifted (from the left) over the spline 31 of sleeve 9 (FIG. 4) until abutting carrier-flange 5. Now, annular disk 10 is turned by an angle equal to half the gear pitch to the position shown in FIG. 3, in which the teeth of gear disk 10 are aligned with the ridges of spline 31. As the spline 31 is thereafter shifted into the spline 30 of shaft 1, gear disk 10 can be bolted onto the axial end of shaft 1.

FIGS. 3 and 4 show also the relative position of several of the bores. Shaft 1 has a plurality of blind-threaded bores just as bore 45 (see also FIG. 2) and planet carrier 5 has a complimentary set of wider bores, such as bores 43. Annular disk 10 has unthreaded bores, such as bores 44.

When the gear disk 10 is slipped onto and over the spline 31, bores 44 and 43 are not aligned; these bores, including bores 45, will be aligned in triplets when the disk 10 has been turned into its securing position (FIG. 3).

Now, bolts 11 can be inserted; their heads 32 are located in and clear bores 43 of carrier 5, while their threaded shank is threaded into the respective bore 45 until the head 32 clamps the disk 10 against bearing race 34 and shaft 1.

The invention is not limited to the embodiments described above; but all changes and modifications thereof, not constituting departures from the spirit and scope of the invention, are intended to be included.

We claim:

1. Connection of a hollow shaft to a planet gear carrier for preventing the carrier from turning relative to the shaft having an internal spline gearing near one end, comprising:

a sleeve being secured to or integral with said planet gear carrier, the carrier resembling a flange at the sleeve, the sleeve being provided with an external spline, there being an annular recess between the spline and the carrier;

said shaft having an end portion provided with an internal spline, for coupling with the external spline of said sleeve; and a gear disk having internal teeth and being disposed so that the teeth extend into the recess, the teeth being aligned with ridges of said external spline, the disk being releasably secured to said shaft, an axial length of the recess being larger than the thickness of said disk, so that the carrier can axially move relative to the shaft and the disk over a limited range.

2. Connection as in claim 1, and including a hub element; bearing means for journalling the hub element on said shaft; and said annular disk having a larger diameter than the shaft to engage the bearing means on said shaft for loading the bearing means.

3. In a hydrostatic vehicle drive, including a hollow shaft, a hydrostatic motor journalled in the shaft; a hub element journalled on the shaft; planetary gear means coupled to the hub element for driving same, further having an input shaft coupled to the motor, a connection for supporting a planet gear carrier in the planetary gear means, comprising:

an internal spline provided at one end of said hollow shaft;

a shaft means with external spline extending from the carrier and having an annular groove between the external spline and the carrier, the groove being deeper than the axial grooves of said external spline, these axial grooves being provided between ridges, the external spline engaging said internal spline; and an annular disk with inwardly oriented teeth and being affixed to said shaft end, the teeth extending into the annular groove and being axially aligned with said ridges of said external spline, the disk being thinner than an axial width of the annular groove.

4. The apparatus as in claim 1 or 3, said carrier having a plurality of bores, said disk having a similar plurality of bores, said shaft having a plurality of bores, these bores being respectively aligned in triplets for permitting bolt-fastening of the disk to the shaft, upon misalignment the disk being able to be slid onto and over said external spline, prior to fastening the disk to the shaft end.

* * * * *